United States Patent [19]

Fortune

[11] Patent Number: 5,048,742
[45] Date of Patent: Sep. 17, 1991

[54] SOLDER-DESOLDER MODULAR STATION

[76] Inventor: William S. Fortune, 29866 Cuthbert St., Malibu, Calif. 90265

[21] Appl. No.: 537,581
[22] Filed: Jun. 14, 1990
[51] Int. Cl.⁵ .............................................. B23K 3/00
[52] U.S. Cl. ................................. 228/20; 228/46; 228/51; 219/227; 219/240; 219/242
[58] Field of Search .................. 228/20, 46, 51, 55, 228/57; 219/227, 240-242

[56] References Cited

U.S. PATENT DOCUMENTS

| 2,327,073 | 8/1943 | Smith, Jr. ........................ | 219/242 |
| 3,267,254 | 8/1966 | Weller et al. ................... | 219/242 |
| 4,117,967 | 10/1978 | Regelson et al. .............. | 228/57 |
| 4,176,778 | 12/1979 | Fortune ........................... | 219/242 |
| 4,435,636 | 3/1984 | Royston ......................... | 228/20 HT |
| 4,471,898 | 9/1984 | Parker ........................... | 228/20 HT |
| 4,568,011 | 2/1986 | DeArmitt et al. .............. | 228/20 HT |
| 4,887,759 | 12/1989 | Alexander ..................... | 228/20 HT |

Primary Examiner—Samuel M. Heinrich
Attorney, Agent, or Firm—Daniel J. Anderson

[57] ABSTRACT

A modular soldering station is disclosed which includes a base unit containing a soldering instrument power supply and having a plurality of holding fixtures to which may be attached novel modular desoldering tools, component pick up tools, vacuum fume removal apparatus, and cradling means for each. Different combinations of such implements may be used to make up a particularly desired soldering station for a given soldering/desoldering task or set of tasks.

10 Claims, 6 Drawing Sheets

SOLDER-DESOLDER MODULAR STATION

BACKGROUND OF THE INVENTION

This invention relates generally to the field of soldering and more particularly to an integrated and modular operator's station for the soldering, desoldering, and handling, especially of small, delicate, or expensive electronic components.

In modern electronics manufacture, maintenance, repair, and research and development, the desoldering and resoldering, as well as much initial soldering of intricate and delicate components have become routine necessities. Such components are typically multiterminal integrated circuit chips or other devices designed to be surface mounted on a printed circuit board. These components are often very expensive and are mechanically and thermally delicate or vulnerable to damage from physical or thermal shock. In addition, the circuit board and other components proximate to that being worked upon may similarly be vulnerable to expensive damage during the process.

Accordingly, various hand tools have been developed in the prior art for melting solder at the terminals of such components with optimum temperature and heating capacity and with soldering tips adapted to reach, selectively, particular ones of the small terminals of the components without damaging the component or surrounding elements. Such soldering tools, while being thermally adequate, should desirably be convenient and safe for the operator to handle, store, and maintain.

With the advent of environmental concerns for personnel safety and comfort, a significant awareness of and sensitivity to the noxious fumes from the soldering instrument has developed. The fumes from rosin and flux and other materials may be generated initially at the soldering work point and, in addition, continue to exude from materials remaining on the soldering tip when it is rested on the workbench or other storage place which may be near the face of the operator.

The difficulties in desoldering a component, especially a multiterminal one, from a circuit board are well appreciated by practitioners in this field: the binding solder must be carefully melted and maintained in the liquid state until it can be removed. Techniques of blowing or shaking it off are generally unacceptable; and simple hand held one-shot piston stroke or squeeze bulb devices are undesirably awkward and often ineffective. Vacuum probes connected by lines to an electrically powered vacuum pump exist in the prior art, but are noisy, complex, and expensive to obtain and maintain.

Handling the surface mounted device in connection with its installation or removal from a circuit board has been a difficult task aggravated by the often tiny geometry of the chip and its delicate and expensive nature. Small, long nose forceps are sometimes used and other techniques such as a bulb of sticky putty on the end of a fine rod or stick to hold temporarily the component are sometimes used but obviously suffer disadvantages and limitations.

Accordingly, it is an object of the present invention to provide an integrated solder-desoldering station which includes soldering, vacuum desoldering, and part handling capabilities which is not subject to these and other disadvantages and limitations of the prior art.

It is another object to provide such a station which provides precision, constant temperature soldering capability in a compact light weight, and convenient to handle and operate tool.

It is another object to provide such a station which provides a safe, convenient, and energy conserving resting position for the soldering instrument while it is not in actual use but ready for immediate use in soldering-desoldering operations.

It is another object to provide such a station in which noxious soldering fumes are quickly and continuously removed from the immediate environment of the operator.

It is another object to provide such a station in which the operating temperature of the soldering instrument is electronically, precisely controlled remotely from the hand held portion thereof.

It is another object to provide such a station at which the soldering tip of the soldering instrument may be readily cleaned thereby maximizing its solder melting and handling characteristics while removing noxious fume creating residues and maximizing the longevity of the tip and/or it's plated surface.

It is another object to provide such a station including a vacuum operated desoldering instrument having a strong, continuous or multi-pulse suction action.

It is another object to provide such a station including a convenient, hand held desoldering tool which is safe, quiet, reliable, rugged and easily operated and maintained and which does not require a motor driven vacuum pump.

It is another object to provide such a station which provides a convenient, efficient resting place for the desoldering tool.

It is another object to provide such a station which includes a vacuum operated tool for selectively picking up, holding, and releasing small surface mounted devices for soldering or desoldering them.

It is another object to provide such a station which includes a convenient and efficient resting holder for the pick-up tool.

It is another object to provide such a station which is modular in nature for integrating various selected solder-desoldering capabilities into a consolidated compact facility.

SUMMARY OF THE INVENTION

Briefly, these and other objects are achieved in an example of the invention which includes a base unit which houses an electronically controlled power supply for a soldering instrument which is of the character to utilize the heating element of the instrument as temperature sensing means to provide feedback, remotely, to the power supply circuit for maintaining the temperature of the soldering tip at an adjustable predetermined quantity irrespective of its thermal loading. The base unit includes modular bracket means for holding various soldering-desoldering implements; and the soldering instrument includes an insulated pod-like holder removably attached to the modular bracket.

Also removably carried on the modular bracket is a cradle holder and vacuum producing module for a hand held solder removing tool. The vacuum module, by attachment to a normal compressed air source, provides, by means of a compact two stage venturi, a vacuum line from the venturi primary to the desoldering nozzle at the end of the desoldering tool. The cradle holder includes means for cleaning the nozzle of the desoldering tool and for automatically, when desired, turning off the incoming compressed air when the tool is placed in its holding cradle.

A component pick-up tool holder is also affixed removably to the modular bracket. The pick-up tool is vacuum operated by a vacuum line extending from its soft rubber suction cup probe end to the second stage of the venturi. The pick-up probe is carried by a pencil-like handle having a pick-up control bore into its forward end connected to the vacuum line for by-passing, or shorting out, when desired, the vacuum flow from the pick-up tip to the venturi.

Also connected to the second stage of the venturi is a fume collector line which terminates at its opposite end in a metal tube held by the front end of the soldering instrument in close proximity to the soldering tip. A large filter may be carried by the base unit through which the collected fumes must pass wherein they are cooled and highly filtered to remove particulate matter and precipitate much of the noxious materials from the fumes.

DETAILED DESCRIPTION OF A PREFERRED EMBODIMENT

In the example of the invention illustrated and described hereinbelow, a modular system is shown including in FIG. 1 a base unit 20 which supports, controls, or houses various soldering and desoldering tools or appliances in a selective modular manner. Essentially standard with the unit 10 in this example, however, is an electronically remotely controlled soldering instrument 21 which includes a handle body 22, a forward end sleeve portion 24 within which is carried an electrically energized heating element 26 which is thermally coupled to the soldering tip 28 and powered through a standard power cord 30. The soldering instrument 21 may, for example, be of the character of that disclosed in the U.S. Pat. No. 4,734,559 issued Mar. 29, 1988, to William S. Fortune and Wayne A. Murray, and which, in turn, may incorporate an electronic temperature control circuit described in U.S. Pat. No. 4,507,546 issued Mar. 26, 1985, to William S. Fortune, Robert C. Griffith, and Wayne A. Murray. In essence, the control is achieved by interrupting the power connection to the heater each time its alternating current voltage passes through zero. The interrupted lines are then momentarily used to sense the instantaneous resistance of the heater element which as a function of its temperature is then used in a feedback sense to control the power going to the heater element during the current flow portions of each alternating current cycle. The control circuit 32, including its connection 34 to a power source and the heater element 26 of the soldering instrument 21 is shown in FIG. 2. The temperature control adjustment potentionometer 36 is carried on the control panel 38 of the base unit 20 as is the on-off switch 40 which is preferably of the character to serve also as a pilot lamp 42. An auxiliary power outlet 44 carried in the front lower face of the base unit 20 may be provided as desired. Also carried in the base unit 20 is shown a sponge 46 which is moisturized by a reservoir 48 and is used to wipe the soldering tip 28 clean of solder and flux residue. This cleaning process minimizes the generation of noxious gases from such residue particularly during the idle portions of the duty periods of the heated instrument. A tool tray 49 is formed in the front lower portion of the base unit 20 for holding tool bits, spares, or the like. A set 50 of modular holding brackets 52 is mounted at a useful inclined angle of approximately 30° across the top rear portion of the base unit 20. In this example, the number of the brackets 52 affixed by mounting screws 54 to the housing base unit is chosen to be 5; however, a smaller or larger number may be utilized as desired depending upon the number and character of the soldering and desoldering or related tools or appliances selected to be used in cooperation with the modular system. It may be noted, for example, that a second, miniature, or heavy duty, soldering instrument may desirably be plugged into the receptacle 44 and held by means affixed to one of the modular brackets 52.

Each of the brackets includes an elongate body portion 56 with beveled edges forming the male part of a sliding dove tail joint, the female part being affixed to a mating portion of an attachment to be affixed thereby to the base unit 20. Continuously to at least one end of each of the elongate bracket body portions 56 is disposed a flexible latching lever 58 which includes an upwardly projecting locking tab 60 for engaging the end of the mating female bracket portion and which is selectively releasable by pressing the latching lever 58 downwardly.

Figures 3, 4:
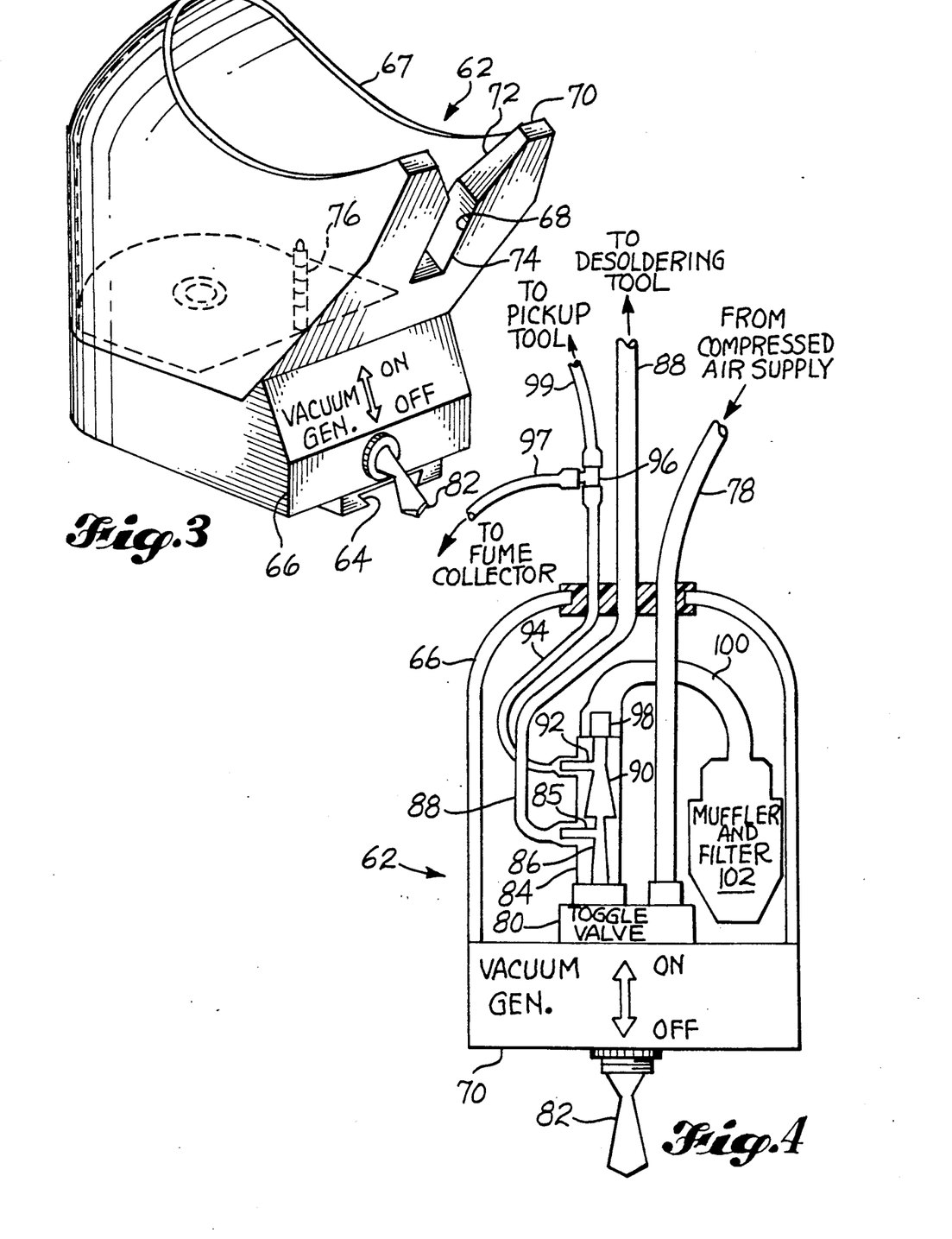
FIG. 3 is a perspective view of a vacuum generating module and desoldering tool holder for use in combination with the apparatus of FIG. 1.
FIG. 4 is an internal and schematic view of the apparatus of FIG. 3.

Referring to FIG. 3, a vacuum generating module and desoldering tool cradle 62 is shown to include a female dovetail bracket 64 affixed to the lower or base of a vacuum generator housing portion 66 of the cradle 62. The cradle is essentially a cup shaped retainer 67 having a tool hanger slot 68 formed at its operator facing end 70. The hanger slot 68 may preferably be formed with an enlarged width at its top 72 tapering to a constant width main portion at 74. Within the retainer cup and projecting upwardly is shown disposed a fixed, but optional desoldering tool nozzle cleaning post 76. To attach the cradle 62 to the base unit 20, the female dovetail bracket 64 is slid over and along the length of one of the male dovetail bracket portions 56 (FIG. 1) until its locking tab 60 engages the end of the female portion 64 and thereby locks it in place.

The base of the cradle 62 constitutes the vacuum generator housing 66 the interior structure thereof being shown in FIG. 4 to which reference is here made. A line 78, adapted to be connected by conventional means to a source of compressed air at a pressure of the order 75 to 100 PSI, is shown entering the housing 66 at its rear end and being connected to a gas toggle valve 80 having its actuator lever 82 projecting forwardly of the end 70 of the module 62. The output of the toggle valve 80 is connected to a two stage, in this particular example, venturi device 84. The low pressure port 85 of the first venturi stage 86 is shown connected to a vacuum line 88 which passes out of the rear of the housing 66 and toward a connection, not shown, to a desoldering tool. The output of the first venturi 86 which includes any air drawn in through the line 88 and low pressure port 85 is then used to drive the second venturi 90. Its low pressure port 92 is shown connected to a vacuum line 94 which in turn is connected through a tee connector 96 to a fume vacuum line 97 and pickup tool vacuum line 99, not shown. The output of the second venturi 90 including all gases drawn into both venturis is driven through the output port 98 into a line 100 which is then connected to a muffler and filter unit 102. The unit 102 minimizes the noise of the venturi device 84 and cools, precipitates, and removes noxious materials from the lines 98, 94 before exhausting the compressed air into the environment of the operator. When desired, and in accordance with the principles of the present invention, the line 100 may be readily extended to a position as remote from the environs of the operator as desired.

Figure 5:
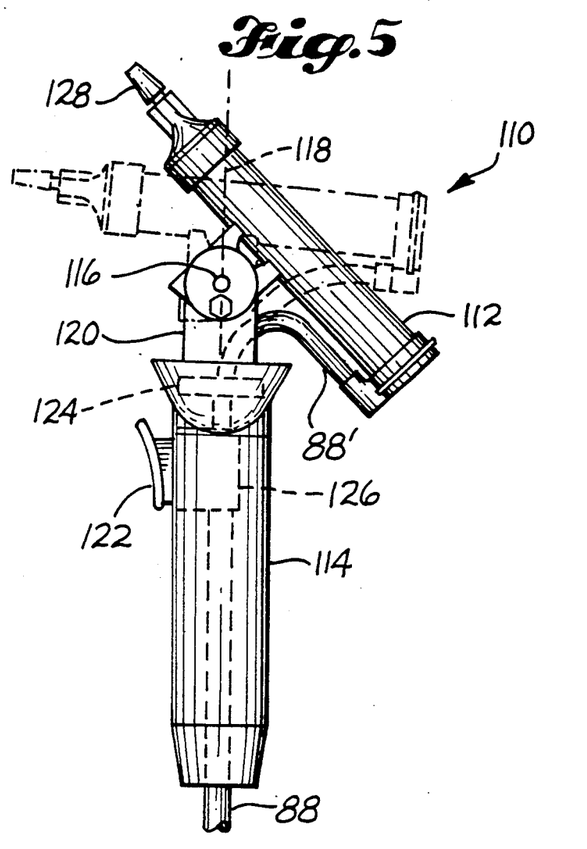
FIG. 5 is a side elevational view of a desoldering instrument component for use in combination with the apparatus shown in FIGS. 1 and 3.

Referring to FIG. 5, a hand held desoldering tool module 110 is illustrated and includes a desoldering head 112 and a handle body 114 interconnected by an adjustable angle joint 116. The angle joint may be a machine screw and wing nut, or the like, so that the operator may choose a preferred angle for the head 112 with respect to the longitudinal axis 118 of the handle for the particular type of desoldering work to be done. The handle body 114 includes an end shank portion 120 which is rotatably adjustably carried by the remainder of the handle body. The rotatable adjustment constitutes an approximately 340° freedom of rotation of the end portion 120 with respect to the body 114 about their mutual axis 118. One of the benefits, others being described below, of this degree of freedom of adjustment is that the operator may position the actuating trigger 122 at a chosen angle about the axis 118 with respect to the angular alignment of the head 112 about the same axis. The angular adjustment action between these two portions of the handle body may be achieved by a conventional spring, ball, and detent means 124 indicated in dashed lines at the juncture of the two coaxial parts.

The trigger 122 actuates a toggle or poppet valve 126 carried internally of the handle body 114 which abruptly connects, for desoldering action, the vacuum line 88 (FIG. 4) to its head portion line 88' and thence to the desoldering nozzle 128. Further and internal details of the desoldering head 112 are described infra.

Figure 6:
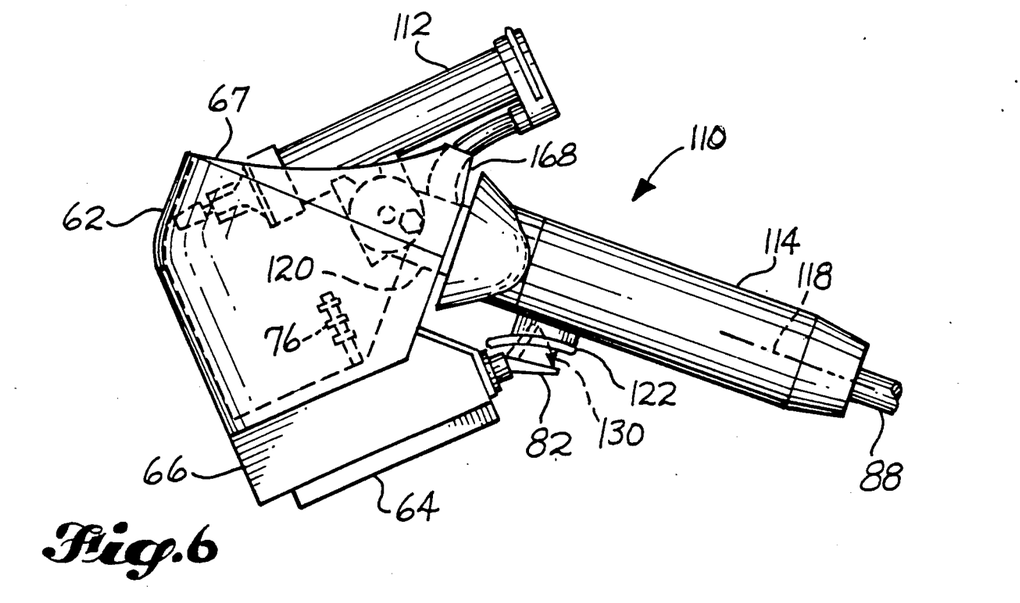
FIG. 6 is a side elevational view of the combined apparatus shown in FIGS. 3 AND 5.

In FIG. 6, the desoldering tool 110 is shown in its rested, or idle, position held by the cradle module 62. The shank portion 120 is held snugly within the hanger slot 68 of the cup shaped retainer 67 and may be readily lifted therefrom by the operator when a desoldering step is to be performed. In a preferred, and normal mode of operation, the operator thusly lifts the desoldering tool from the cradle and in the same stroke lifts the vacuum toggle valve lever 82 with a forefinger. Then, during the time of moving the desoldering tool to the workpiece, the line 88 is evacuated and forms a vacuum reservoir to provide a particularly high initial impulse vacuum stroke when the trigger 122 is depressed by operator's finger.

At the end of the particular desoldering step, the operator may return the tool 110 to its holding slot 68 in the cradle 62; and, in so doing, the trigger 122 automatically engages the lever 82 and pushes it downwardly to its off position as indicated by the dashed lines 130. When, however, it is desired that the venturi continue to operate, as for fume removal or parts handling as described infra, the shank portion 120 of the desoldering tool may be rotated 90° or so with respect to the angular alignment about the axis 118 of the head 112. In this manner, the trigger 122 is rotated out of an engaging relation with the valve trigger lever 82 whereby the desoldering tool may be rested in the cradle 62 without turning off the venturi action.

Figure 1:
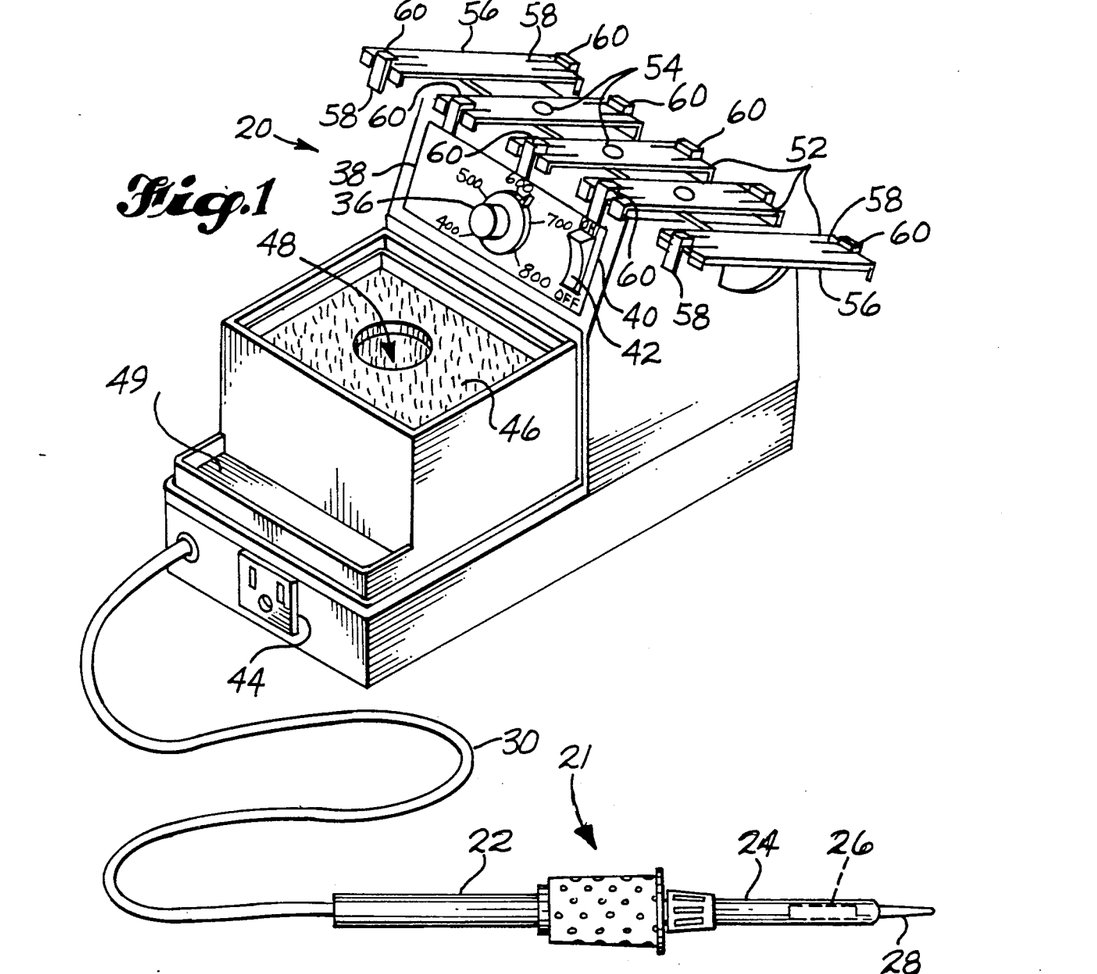
FIG. 1 is a perspective view of an example of a base component and soldering instrument of a modular solder station constructed in accordance with the principles of the present invention.
Figure 2:
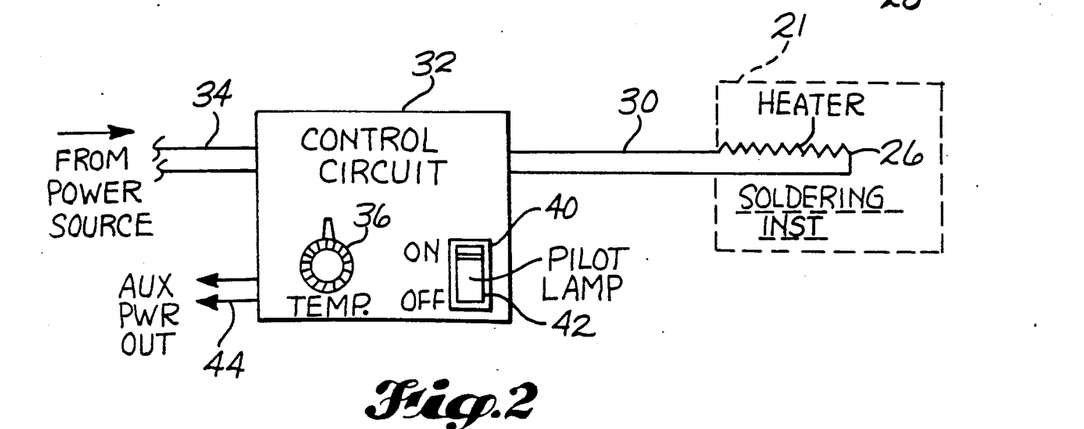
FIG. 2 is a block diagram indicating certain electrical aspects of the invention.

Further details shown in FIG. 6 include the vacuum generator housing portion 66 and its female dovetail bracket 64 for modular attachment to one of the male dovetail brackets 52 (FIG. 1).

Figures 7, 8, 9:
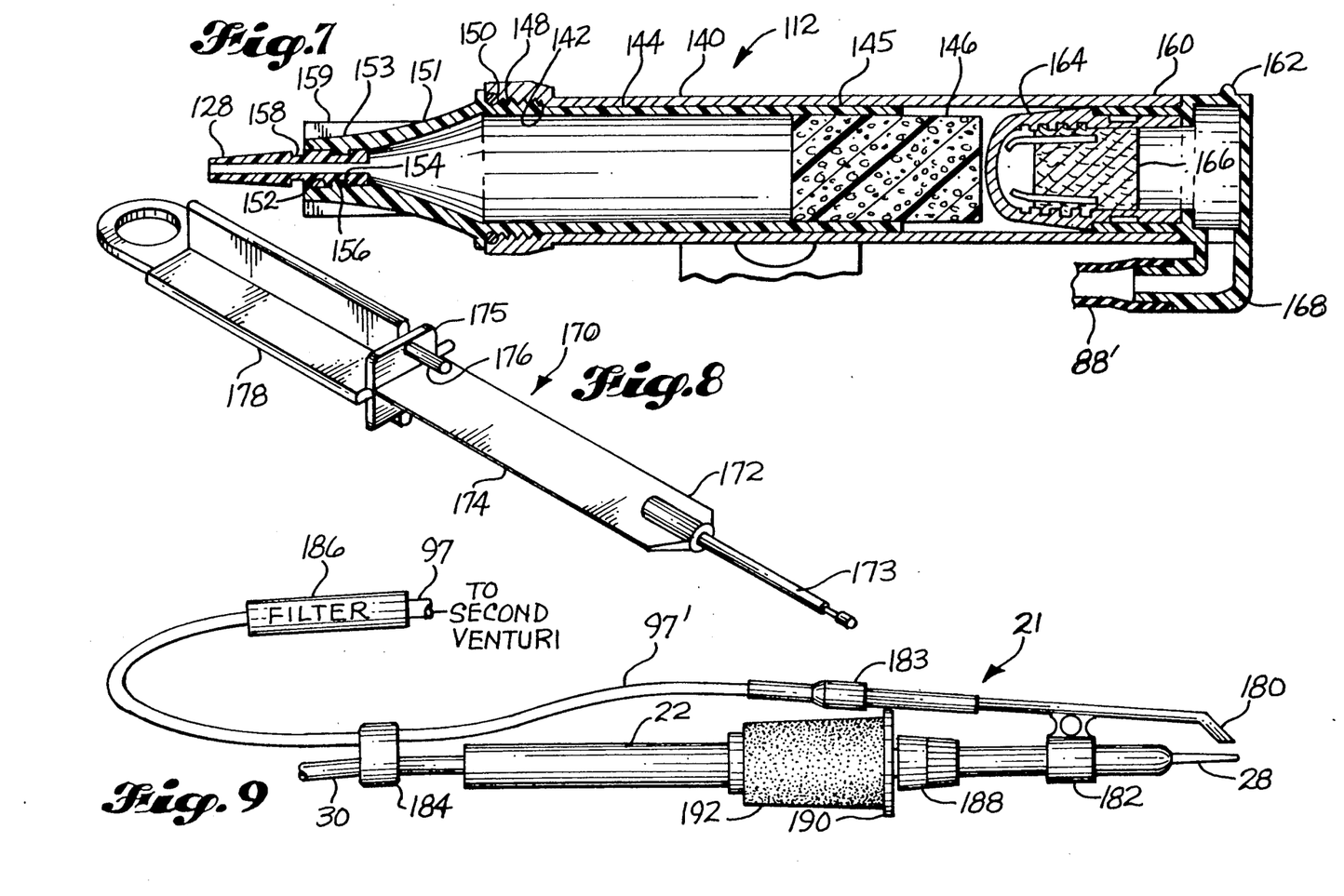
FIG. 7 is a longitudinal sectional view of the desoldering head portion of the instrument illustrated in FIG. 5.
FIG. 8 is a perspective view of a cleaning tool for different portions of the desoldering head.
FIG. 9 is a side elevational view of the soldering instrument of FIG. 1 shown with soldering fumes extraction apparatus.

Referring to FIG. 7, internal details of the head 112 of the desoldering tool 110 are shown to include a metal cylindrical outer housing 140 having an internally threaded forward end 142 for holding a desoldering cartridge 144. The main, rear body portion 145 of the cartridge is a thin walled cylinder open to the rear and housing a removable, plastic foam filter element 146. The forward end of the cartridge is threaded at 148 and fitted with a sealing o-ring 150 in order to be securely held in vapor sealed relation by the threads 142 of the housing 140. Forwardly of the threads 148, the cartridge 144 is tapered to form a conical nose portion 151 which at its forward end 153 is reduced to a smaller diameter to form a retaining bore 152 for holding a disposable nozzle tip 128. The bore 152 is formed, in this example, with a reduced diameter retaining ridge 154 for engaging a mating groove 156 in the outer cylindrical surface of the tip 128. An additional groove 158 and cooperating fins 159 are shown externally of the forward end 153 of the cartridge 144 and is for the purpose of being grasped by a removal tool of the character to insert or remove the tip 128 from the retaining bore 152. Such tips and tool and method are disclosed in U.S. Pat. No. 4,919,322 entitled Desoldering Tip and Replacement Apparatus issued Apr. 24, 1990, to William S. Fortune and Robert E. Dallons.

The rear end 160 of the housing 140 is open for receiving and retaining a plastic fitting 162 which fits snugly but removably within the end 160. Retained, in turn, within the fitting 162 is a thimble-like element 164 which is liberally slotted or foramenated to pass the desoldering air vacuum stroke while retaining a replaceable cotton wad filter element 166. The rear of the fitting 162 is molded to form a male fitting 168 for attachment, as shown, to the vacuum line 88'.

In a preferred mode of operation, when the cartridge 144 needs servicing, it is simply removed from the front of the head 112 along with its nozzle 128 and filter element 146. A new cartridge, with a new tip 128 and a clean filter element 146, is then readily reinserted into the head 112; and desoldering work may continue essentially uninterrupted.

The cartridges may then be serviced separately by replacing the filter element 146 and any heat damaged tip 128. At the same time the internal, solder bit collecting surfaces of the nozzle 128 and cartridge 144 may be cleaned by inserting a plastic cleaning tool 170 into the open rear of the cartridge portion 145. The forward end 172 of the tool 170 holds a metallic cleaning rod 173 for insertion into the nozzle 128 while the shape of the blade body portion 174 of the tool is formed to conform to the internal surfaces of the cartridge 144 including its forward conical portion 151 and its open cylindrical body portion 145. Upon insertion into the cartridge, the tool 170 is stopped by a transverse base plate 175 and guided by a pair of longitudinally aligned pins 176 whose radial spacing, along with the width of the blade portion 174, essentially matches the inner diameter of the body portion 145 of the cartridge. In operation, then, the tool is inserted fully into the cartridge and then rotated back and forth whereby the edges of the blade portion 174 scrape the cartridge clean of bits of solder, solidified flux, and the like. The remainder of the tool 170 aft of the base plate 175 serves as a handle 178 for using the tool.

It may be noted that, when desired, an elementary, vacuum operated desoldering tool consisting of essentially only the head portion 112 may be utilized in accordance with the modular aspects of the invention. The simpler version is particularly feasible when a foot switch (see FIG. 13) is utilized to operate the venturi.

In FIG. 9, the soldering instrument 21 is shown with a metal fume collector nozzle 180 held in place contiguously to the soldering tip 28 by a metal collar 182 which snugly slidingly engages the soldering instrument sleeve 24 midway along its length. The nozzle may, accordingly, be adjusted by the operator to a particular location of choice with respect to the tip 28. The rear of the nozzle 180 is connected by a fitting 183 to the vacuum line 97' which extends along the length of the power cord 30, retained therealong by a series of clips 184, toward the base unit 20. A large-surface filter 186 is shown interspersed along the fume collector vacuum line 97, 97' for precipitating and holding noxious materials drawn thereinto from the solder operations at the tip 28. As shown in a later figure, the filter 186 may be removably attached to the body of the base unit 20 for ease in its servicing or replacement.

Other details of the soldering instrument 21 may be exactly as shown and described in connection with the discussion supra of FIGS. 1 and 2. It may be further noted that the sleeve portion 24 is retained to the body handle 22 by a retaining nut 188 and that a finger guard enlarged diameter rim 190 assists the operator in keeping fingers from contacting the hot sleeve 24 and nut 188. For the further comfort and safety of the operator. A foam sleeve 192 may be disposed over the handle body continuously aft of the rim 190 to cushion and thermally insulate the operator's fingers from the handle.

Figures 10, 12:
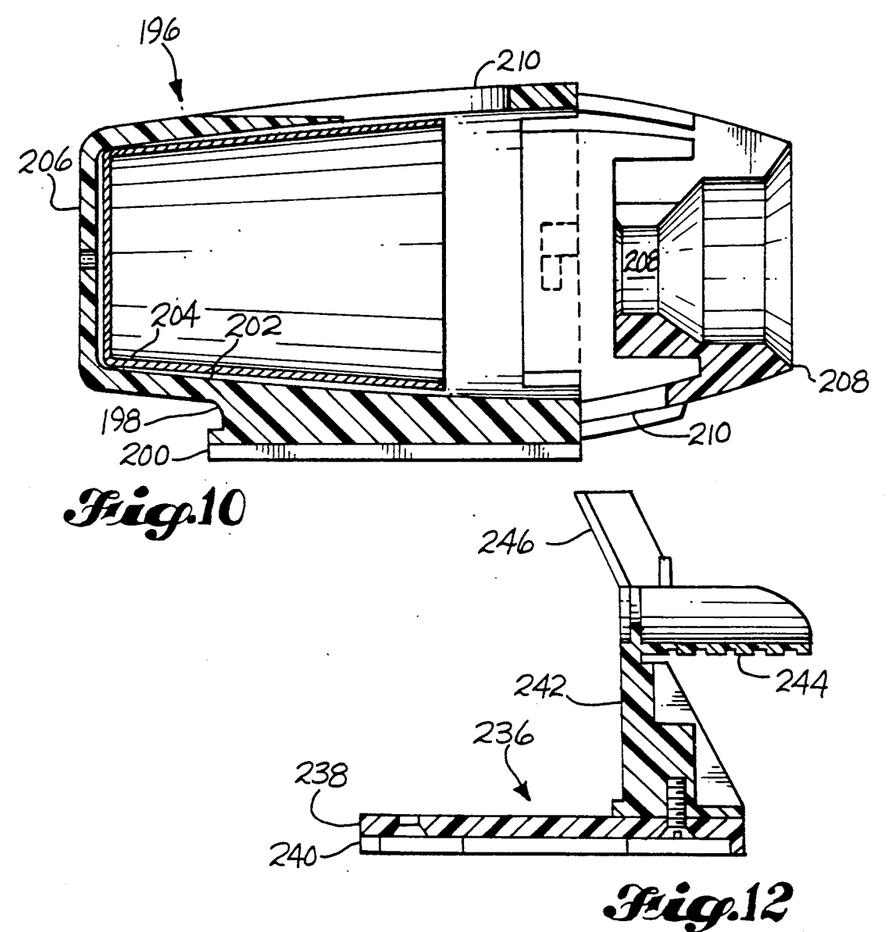
FIG. 10 is a longitudinal sectional view of an insulated soldering instrument holder for the tool of FIGS. 1 AND 9.
FIG. 12 is a sectional view of a holder for the tool of FIG. 11.

Referring to FIG. 10, a modular soldering instrument holder 196 is shown for conveniently, safely, and thermally efficiently nesting the soldering instrument 21 when it is not in actual soldering use. As with the other modules shown, the base 198 of the holder 196 is formed to include a female dovetail bracket 200 for removably engaging one of the male dovetail brackets 52 (FIG. 1). The remainder of the holder may be essentially a tubular barrel 202 molded of an appropriate plastic and fitted with a highly reflective foil liner 204 over a major portion of its internal surfaces. The barrel may be closed at its forward end 206 and open at its larger diameter rear end 208 for receiving the soldering instrument 21 along its sleeve 192 with a holding slot 208, the rim 190 resting normally inside the slot 208 to stabilize the instrument from being inadvertently pulled out of the holder 196. A series of slots 210 may be provided for the inlet of air to assist in the removal of fumes along the line 97', 97 when the heated iron is at rest in the holder.

Figure 11:
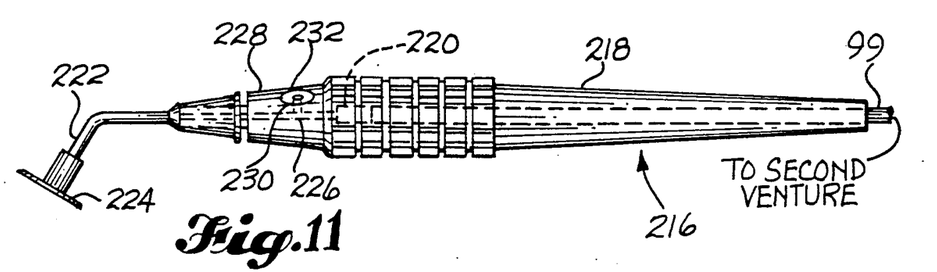
FIG. 11 is a side elevational view of an example of a vacuum operated pick-up tool component of the invention.

In FIG. 11, a small parts pick up tool 216 is illustrated and shown to include a pencil-like handle 218. The vacuum line 99 from the second stage of the venturi 84 (FIG. 4) connects by a fitting 220 within the handle 218 to a vacuum probe 222 which projects forwardly from the front of the handle 218. The probe is fitted with a soft flexible rubber "suction cup" element 224. Forwardly of the fitting 220, a tee junction 226 is formed within the nose portion 228 of the handle 218. The side port of the tee 226 is vented to the ambient atmosphere by a duct 230 which outlets in a finger tip receiving depression 232. When the operator holds his finger tip within the depression 232, air flow is caused to travel into the "suction cup" element 224 and create a gentle pick up force for lifting or holding a small part such as a surface mounted microchip or the like. When the finger is removed, the suction cup is effectively bypassed whereby its lifting force disappears. It may be noted that air flowing into the element 224 may be utilized beneficially to cool an area or a small part while it is being exposed to the thermal shock of a soldering operation.

In FIG. 12, a modular holding fixture 236 for the pick up tool 216 is illustrated. Again the base 238 of the holder fixture is formed to include a female dovetail bracket 240 to engage one of the male brackets 52 (FIG. 1). An upright standard 242 supports a cradle 244 which receives and holds the pickup tool 216 when it is not in actual use. A pair of guide extensions 246 extend upwardly, divergingly away from the cradle 244 to assist the operator in placing the tool in its nested position.

Figure 13:
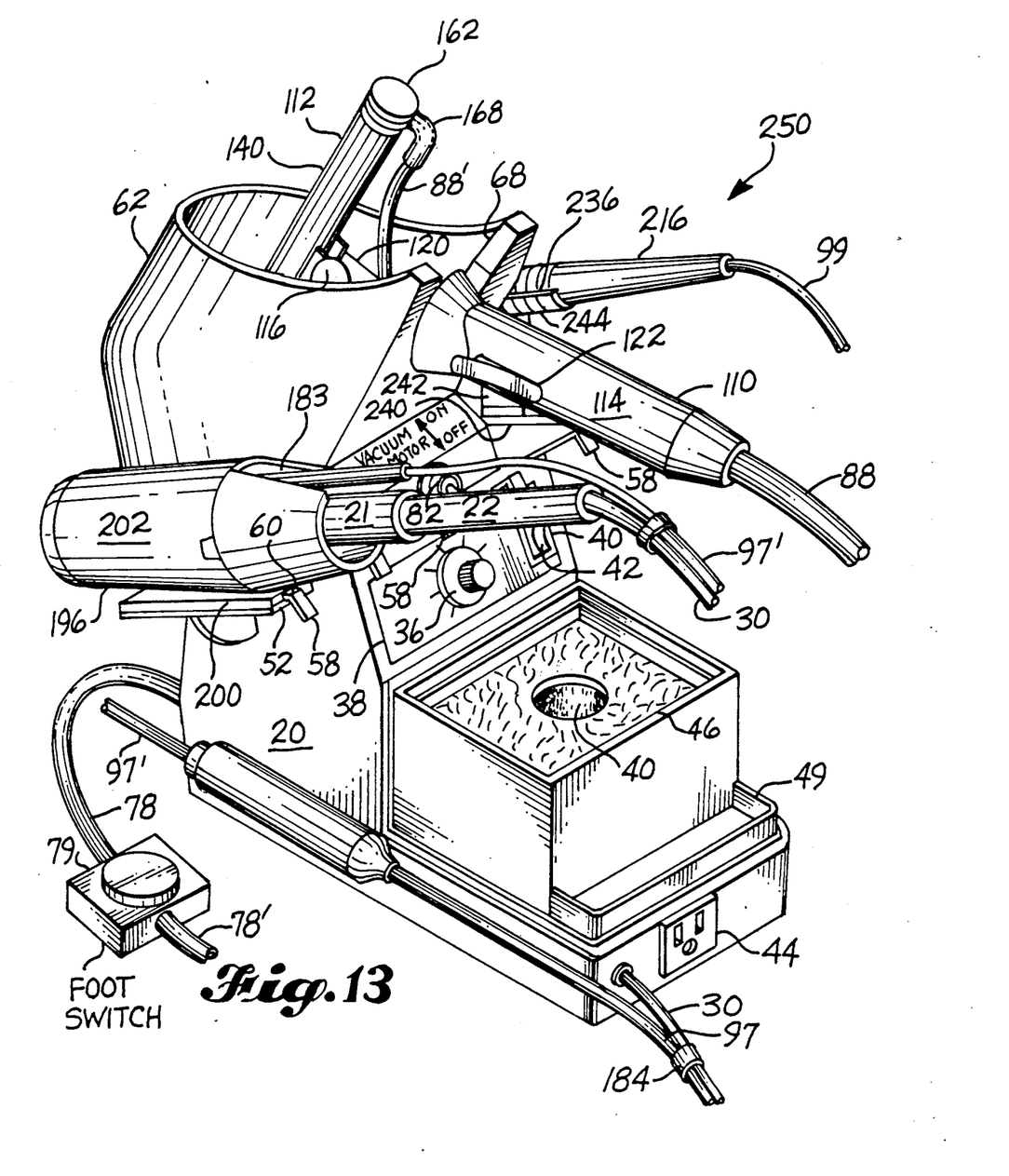
FIG. 13 is an overall assembled, perspective view of the example of the invention which is shown in the above figures in its various separate modular components.

Referring to FIG. 13 a complete example of a solder-desolder modular station 250, is illustrated in its fully assembled configuration. The base unit 20 which may be identical to that illustrated in FIG. 1 supra is shown with the soldering instrument holder 196 of FIG. 10 attached by the mated dovetail brackets 52, 200 to the left most of the five available brackets on the base unit. The latching lever 58 and locking tab 60 may be seen in their role of securing the dovetail portions against any relative longitudinal displacement. In turn, the soldering instrument 21 is shown nested within the barrel portion 202 with its handle body 22 projecting toward the operator's position. The power cord 30 and the fume collector vacuum line 97', 97 attached thereto by the clips 184 is shown with the large filter 186 affixed to the side of the base unit 20 as by, for example, mating strips of hook and loop fastening fabric affixed respectively to the filter body and base unit.

Also depicted in FIG. 13 is an optional foot "switch" 79 interposed as shown in the compressed air line 78, 78'. By this means, the operator may control all the vacuum operations with a toe on the valve to obtain instant vacuum action just when desired without taking a hand away from the other solder/desolder operations.

Centrally mounted on top of the base unit 20 is the desoldering tool cradle 62 with a desoldering tool 110 shown nested therein in the holding slot 68. In this particular example, the shank portion 120 of the handle 114 has been rotated 90° with respect to the handle portion per se in order to angularly dispose the trigger 122 to the side so that the vacuum valve toggle lever 82 may be controlled independently of whether the desoldering tool is disposed in the cradle. Again, the latching lever 58 is shown for locking the holder to the base unit 20. The desoldering vacuum line 88 connects the tool 110 to the venturi within the base unit 20.

Finally, the pick up tool 216 is shown in its nested disposition within the holder 236 similarly attached by a set of dovetail brackets to the base unit 20. The pick up vacuum line 99 connects the tool to the venturi unit in the base unit as described supra.

There has then been disclosed and described an example of a set of modular soldering tools which cooperate with each other and with a modular base unit to achieve the objects and exhibit the advantages pointed out earlier herein-above.

I claim:

1. A solder-desolder modular station comprising:
   a base unit;
   a remote temperature control soldering instrument power supply housed therewithin an electronically temperature controlled soldering instrument connected to said power supply for energizing its electrically heated soldering tip;
   at least one modular solder-desolder tool holder; and
   modular mounting means disposed along the top of said base unit and being of the character to support removably a plurality of said solder-desolder tool holders.

2. The invention as set forth in claim 1 in which said modular tool holder includes a vacuum generating portion having mounting bracket means removably attachable to said modular mounting means and a tool rest portion for holding a solder-desolder tool.

3. The invention as set forth in claim 1 in which said modular tool holder includes a tool rest portion of the character to hold said soldering instrument.

4. The invention as set forth in claim 2 in which said vacuum generating portion includes:
   valve means operable externally of said base unit;
   first connection means for coupling said valve means to an external standard source of compressed gas; and
   venturi means coupled to said valve means and having at least one vacuum port.

5. The invention as set forth in claim 4 which further includes a vacuum desoldering implement of the character to be held in said tool rest portion and includes second connection means for coupling said desoldering implement to said vacuum port.

6. The invention as set forth in claim 5 which further includes fume collector means carried by said soldering instrument and third connection means for coupling said fume collector means to said vacuum port.

7. The invention as set forth in claim 5 which further includes:
   a vacuum operated, parts pick-up tool having a nozzle terminating in a soft rubber suction cup element;
   fourth connection means for coupling said pick-up tool to said vacuum port; and
   a pick-up tool rest portion of said at least one holder.

8. The invention as set forth in claim 7 in which said venturi means comprises an initial, first stage venturi chamber having a high vacuum port and a second stage venturi chamber having a low vacuum port, said high and low ports constituting said at least one vacuum port.

9. The invention as set forth in claim 8 in which said desoldering implement second connection means is coupled to said high vacuum port.

10. The invention as set forth in claim 8 in which said fume collector third connection means and said parts pick-up fourth connection means are coupled to said low vacuum port.

* * * * *